Patented Feb. 16, 1937

2,070,870

UNITED STATES PATENT OFFICE 2,070,870

PURIFICATION OF PECTIN SOLUTIONS

Victor E. Speas, Nathan M. Mnookin, and Arthur C. Metcalf, Kansas City, Mo., assignors to Speas Mfg. Co., a corporation of Missouri No Drawing. Application June 17, 1935, Serial No. 27,046

14 Claims. (Cl. 99—133)

This invention relates to the purification of pectin solutions and more particularly to methods of purifying such solutions containing minute amounts of lead to effect its removal therefrom.

In the manufacture of pectin from fruit products such as apple pomace, the peels of citrus fruits and the like, undesirable and harmful quantities of lead may find their way into the pectin product owing to the current use of lead compounds in horticultural sprays. Complete removal of lead from the fruit is usually not effected by washing or removal of spray residues from the exterior of the fruit, since there seems to be some retention as well as some absorption or infiltration of lead compounds into the plant tissues. As a result, in the process of preparing the pectin from the plant tissues derived from sprayed fruit which has been subjected to washing, certain proportions of lead, although very minute, are sometimes found in the resulting pectin solutions. These solutions, which are prepared by cooking the fruit tissues, such as apple pomace, with water, preferably with mild acidification, and which may contain from 0.5 to 2% of pectin before concentration, may contain 0.5 to 1 part per million or somewhat higher of lead.

The pectin solution likewise contains calcium in substantially larger proportions than the maximum quantities of lead which are present. This calcium has its origin in part from the natural calcium content of the fruit product under treatment and in part from the water used in cooking the apple pomace or other fruit product in the process of removing the pectin. The content of calcium may vary from 10 to 50 parts per million or even higher. In general, it is desirable to maintain the pectin solution in an acid condition to avoid undesirable changes in the pectin content, and to avoid a reduction in the yield and strength of the pectin, and this fact is of importance in connection with any procedure that may be employed in the removal of the lead. In general, precipitation methods which have been attempted for the removal of lead from such solutions have not been successful because of the necessity of maintaining acid or non-alkaline conditions in the pectin solutions and because of an apparent interference action of the colloidal pectin in forming these lead precipitates.

In accordance with the present invention, it has been found that removal of the minute quantities of lead may be effected from the usually acid solutions derived in the ordinary process of manufacturing pectin, by the use, as a precipitant, of a soluble oxalate compound such as the alkali metal oxalates, for example, sodium oxalate, ammonium oxalate, or preferably oxalic acid. The proportion of the oxalic acid or other oxalate compound is carefully controlled and does not exceed that required for quantitative reaction with both the lead and calcium content of the solution. It should exceed that required for the quantitative precipitation of the lead alone, as the complete removal of the lead does not appear to be effected unless part or all of the calcium is simultaneously precipitated. We find that in general the quantity of oxalic acid or other oxalate compound added should be that calculated for quantitative reaction with the lead and with a portion and in general about half of the calcium contained in the solution. The proportion may be varied somewhat to remove a greater or less part of the calcium content, since thereby the calcium content in the ash of the final pectin product is decreased and the quality and gelling power of the pectin improved. By properly controlling the proportion of oxalate or oxalic acid used, no detectable oxalate or oxalic acid is permitted to remain or be present in the pectin precipitated from the solution after the precipitated lead and calcium oxalates are removed.

In general, after addition of the precipitant, a small proportion, say ½ to 2%, of a suitable filter-aid, such as fuller's earth, diatomaceous silica, or the like is added to the solution and the solution carefully filtered.

As an illustrative example, to the details of which this invention, of course, is not limited, in view of the normal variations in composition in the products involved, a pectin solution may be prepared by cooking apple pomace with water in the proportions of about 7,000 pounds of the former with about 14,000 gallons of water, the water being acidified, suitably by the addition of 125 to 175 pounds of 30% hydrochloric acid. A pectin solution is thereby formed from the pomace in which solution the pectin concentration may range from 0.5 to 1 or 1.5%. The pomace is then removed by a suitable filter pressing operation. The resulting solution, which may contain from 0.5 to 1 part per million of lead and from 10 to 50 parts per million of calcium, may be directly treated for the removal of the lead or may be partly neutralized with any suitable alkali, such as sodium carbonate, being preferably kept somewhat acid, say at a pH from 2.5 to 4 and preferably from 3 to 4. The oxalate compound, preferably oxalic acid, is then added in a quantity calculated to quantitatively react with all of the lead and part of the calcium, preferably at least half of the latter. The quantity of soluble oxalate compound thus added should not exceed and in general should be somewhat less than that required for quantitative reaction with all of the calcium as well as with the lead. Depending upon the relative proportions of lead and calcium, the amount of oxalic acid required for quantities of the order heretofore referred to will amount to 50 to 75 pounds. One-half to two percent of a suitable filter-aid, such as diatomaceous earth or the like, is added to the solution and the solution filtered. The resulting filtered solution, which has a somewhat reduced calcium content, say 5 to 25 parts per million, is treated by the usual methods for the precipitation of the pectin; for example, by alcohol precipitation from the solution containing or concentrated to contain 2 to 5% pectin. The pectin thus precipitated is substantially free from lead and appears to be definitely improved both in color and strength.

By the expression water-soluble oxalate, the applicants refer not only to the alkali metal oxalates and other water-soluble oxalates but also to oxalic acid.

We claim:

1. The method of removing lead from pectin solutions containing lead and calcium for the production of pectin substantially free from lead which comprises adding a water soluble oxalate to such solution.

2. The method of producing a pectin substantially free from lead from pectin solutions containing lead and calcium, which comprises adding a water soluble oxalate to such solution, filtering out the resulting precipitate, and precipitating the pectin from the solution.

3. The method of removing dissolved lead from acid pectin solutions containing lead and calcium for the production of pectin substantially free from lead which comprises adding oxalic acid to such solution.

4. The method of removing dissolved lead from pectin solutions containing lead and calcium for the production of pectin substantially free from lead which comprises the step of adding a water soluble oxalate to such a solution in an amount sufficient to react quantitatively with all of the lead and at least part of the calcium present therein.

5. The method of producing a pectin substantially free from lead from pectin solutions containing lead and calcium, which comprises adding a water soluble oxalate to such a solution in an amount sufficient to react quantitatively with all of the lead and at least part of the calcium present therein, filtering out the resulting precipitate, and precipitating the pectin from the solution.

6. The method of removing dissolved lead from pectin solutions containing lead and calcium with the latter present in greater proportion than the lead for the production of pectin substantially free from lead which comprises the step of adding a water soluble oxalate to such a solution in an amount not greater than required quantitatively to precipitate all the lead and calcium, and sufficient to precipitate the lead with at least half of the calcium present therein.

7. The method of removing dissolved lead from pectin solutions containing lead and calcium for the production of pectin substantially free from lead which comprises the step of adding oxalic acid to such a solution in an amount sufficient to react quantitatively with all of the lead and at least part of the calcium present therein.

8. The method of producing a pectin substantially free from lead from pectin solutions containing lead and calcium, which comprises adding oxalic acid in such a solution while in acid state, the oxalic acid being added in an amount sufficient to react quantitatively with all of the lead and at least part of the calcium present therein, filtering out the resulting precipitate and precipitating the pectin from the solution.

9. The method of removing dissolved lead from pectin solutions containing lead and calcium with the latter present in greater proportion than the lead for the production of pectin substantially free from lead which comprises the step of adding oxalic acid to such a solution in an amount not greater than required quantitatively to precipitate all the lead and calcium and sufficient to precipitate the lead with at least half of the calcium present therein.

10. The method of producing a pectin substantially free from lead from pectin solutions containing lead and calcium which comprises adding oxalic acid to such a solution while in acid state, the oxalic acid being added in an amount not greater than required quantitatively to precipitate all the lead and calcium, and sufficient to precipitate the lead with at least half of the calcium present therein, filtering out the resulting precipitate, and precipitating the pectin from the solution.

11. The method of removing dissolved lead from pectin solutions containing lead and calcium for the production of pectin substantially free from lead which comprises, adding oxalic acid to such a solution in an amount sufficient to react quantitatively with all of the lead and at least part of the calcium present therein and contacting the solution with a suitable filter-aid.

12. The method of producing a pectin substantially free from lead from pectin solutions containing lead and calcium which comprises adding oxalic acid to such a solution while in acid state, the oxalic acid being added in an amount not greater than required quantitatively to precipitate all the lead and calcium, and sufficient to precipitate the lead with at least half of the calcium present therein, contacting the solution with a suitable filter-aid, filtering out the resulting precipitate, and precipitating the pectin from the solution.

13. The method of producing pectin substantially free from lead from pectin solutions containing lead and calcium which comprises acidifying the solution to a pH in the order of 2.5 to 4, adding oxalic acid to the acidified solution, the oxalic acid being added in an amount not greater than required quantitatively to precipitate all the lead and calcium, and sufficient to precipitate the lead with at least half of the calcium present therein, filtering out the resulting precipitate, and precipitating the pectin from the solution.

14. The method of removing lead from acid pectin solutions containing lead and calcium for the production of pectin substantially free from lead which comprises adding a precipitant of the class consisting of the alkali metal oxalates, ammonium oxalate and oxalic acid to such solution.

VICTOR E. SPEAS.
NATHAN M. MNOOKIN.
ARTHUR C. METCALF.